(12) United States Patent
Al-Qaq et al.

(10) Patent No.: US 9,025,645 B2
(45) Date of Patent: May 5, 2015

(54) TRANSCEIVER IQ CALIBRATION SYSTEM AND ASSOCIATED METHOD

(71) Applicant: MStar Semiconductor, Inc., Hsinchu Hsien (TW)

(72) Inventors: Wael Al-Qaq, Oak Ridge, NC (US); Ryan L. Bunch, Greensboro, NC (US); Dennis Mahoney, Greensboro, NC (US); Paul Brey, Chapel Hill, NC (US)

(73) Assignee: MStar Semiconductor, Inc., Hsinchu Hsien (TW)

( * ) Notice: Subject to any disclaimer, the term of this patent is extended or adjusted under 35 U.S.C. 154(b) by 99 days.

(21) Appl. No.: 13/869,166

(22) Filed: Apr. 24, 2013

(65) Prior Publication Data

US 2014/0321516 A1    Oct. 30, 2014

(51) Int. Cl.
*H04B 1/38* (2006.01)
*H04L 5/16* (2006.01)
*H04B 17/00* (2006.01)
*H04B 1/40* (2006.01)

(52) U.S. Cl.
CPC . *H04B 17/00* (2013.01); *H04B 1/40* (2013.01)

(58) Field of Classification Search
CPC . H04L 23/02; H04L 27/2634; H04L 27/2655; H04L 27/265; H04W 28/04; H04W 28/065; H04B 2001/70935
USPC .......... 375/324, 350, 346, 219, 221; 455/561
See application file for complete search history.

(56) References Cited

U.S. PATENT DOCUMENTS

2007/0189371 A1*  8/2007  Yen ............................... 375/219
2011/0292978 A1*  12/2011 Kravitz ........................ 375/221

OTHER PUBLICATIONS

Elani et al., "I/Q Mismatch Compensation Using Adaptive Decorrelation in a Low-IF Receiver in 90-nm CMOS Process", IEEE Journal of Solid-State Circuits, vol. 41, No. 2, Feb. 2006, pp. 395-404.

* cited by examiner

*Primary Examiner* — Chieh M Fan
*Assistant Examiner* — Wednel Cadeau
(74) *Attorney, Agent, or Firm* — Edell, Shapiro & Finnan, LLC (57) ABSTRACT

Local oscillator (LO) in-phase/quadrature (IQ) imbalance correction data are generated for one or both of the transmitter and receiver of a radio-frequency (RF) communication device. An RF transmitter output signal is generated by the transmitter from a known test signal and transmitted to the receiver, where a baseband receiver signal is produced. A signal characteristic of the receiver baseband signal is measured in the presence of phase shifts introduced in the transmitter output signal. Joint LO IQ imbalance figures of merit are computed from the signal characteristic measurements, each characterizing signal processing artifacts in the receiver baseband signal caused by joint signal processing in the transmitter and the receiver under influence of transmitter LO IQ imbalance and receiver LO IQ imbalance. The LO IQ imbalance correction data are determined from the computed JFMs so that the transmitter LO IQ imbalance is distinctly characterized from the receiver LO IQ imbalance from measurements obtained through no greater than two (2) phase shifts.

9 Claims, 7 Drawing Sheets

TRANSCEIVER IQ CALIBRATION SYSTEM AND ASSOCIATED METHOD

TECHNICAL FIELD

The present disclosure relates to in-phase and quadrature imbalance calibration in communication system transceivers.

BACKGROUND

In-phase (I) and quadrature (Q) imbalance, also referred to as I/Q mismatch, is a well-known undesirable characteristic of communication equipment that implement parallel I and Q signal processing channels in transmitter and receiver circuits found in many wireless communication devices. I and Q imbalance can cause rotation, offset, skewing, and compression of data in both the transmitter and receiver of a communication system to the extent that symbol decisions at the receiver cannot be relied upon. I and Q imbalance is caused by multiple factors including inadequate phase separation in local oscillator (LO) signals, e.g., I and Q channels being other than 90° apart in phase, and circuit component differences that produce unequal signal amplitudes in the I and Q channels where equivalent signal amplitudes are required.

The state-of-the-art has advanced to allow on-chip measurement circuitry for purposes of calibrating I and Q channels in communication equipment to substantially reduce or eliminate gain and phase imbalances. In certain systems, a dedicated on-chip receiver circuit is used to downconvert a calibration signal that has been upconverted by a transmitter for purposes of calibration. However, calibration data that has traversed both a quadrature transmitter circuit and a quadrature receiver circuit contains phase and gain imbalance artifacts from both transmitter and receiver circuits. Thus, pinpointing the source of these imbalance artifacts, i.e., whether they originated in the transmitter or in the receiver cannot be readily determined from a single measurement of the affected signal.

In certain calibration techniques, one of the transmitter or the receiver is first calibrated followed by a calibration of the other of the transmitter and receiver. For example, imbalances between I and Q calibration signals may first be determined in the transmitter and the transmitter may be calibrated accordingly. Once the transmitter has been calibrated, another calibration procedure is performed for the receiver based on the knowledge that the transmitter imbalances have been corrected. In another technique, circuitry is provided to introduce multiple phase shifts between the I and Q data and the I and Q signal channels are monitored while different phase shifts are introduced. The phase shift is continually adjusted until the phase shift that minimizes the transmitter and receiver gain and phase imbalances is determined. The ordinarily skilled artisan will recognize and appreciate that these techniques require a substantial amount of time devoted to the calibration procedure, which in a manufacturing setting can greatly reduce product throughput.

Given the state of the current art, the need is apparent for a calibration technique that can determine IQ imbalance correction data from calibration data that has traversed both transmitter and receiver and that can produce such correction data in a short period of time.

SUMMARY

For purposes of local oscillator (LO) in-phase (I) and quadrature (Q) imbalance calibration, a baseband receiver signal is generated in a receiver from a radio-frequency (RF) transmitter output signal received from a transmitter. The transmitter output signal is generated from a known baseband test signal and difference signals are generated that indicate a characteristic difference between the receiver signal and the test signal in respective frequency bands of the receiver signal as the transmitter output signal is phase-shifted. Measurements of the difference signals are acquired as the transmitter output signal is phase-shifted through no greater than two (2) phase shifts. Joint LO IQ imbalance figures of merit (JFMs) are computed from the difference signal measurements, where the JFMs characterize respective signal processing artifacts in the receiver baseband signal from joint signal processing in the transmitter and the receiver under influence of transmitter LO IQ imbalance and receiver LO IQ imbalance. LO IQ imbalance correction data are determined from the computed JFMs so that the transmitter LO IQ imbalance is distinctly characterized from the receiver LO IQ imbalance.

DESCRIPTION OF EXAMPLE EMBODIMENTS

The present inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, mathematical expressions are contained herein and those principles conveyed thereby are to be taken as being thoroughly described thereby. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

Figure 1:
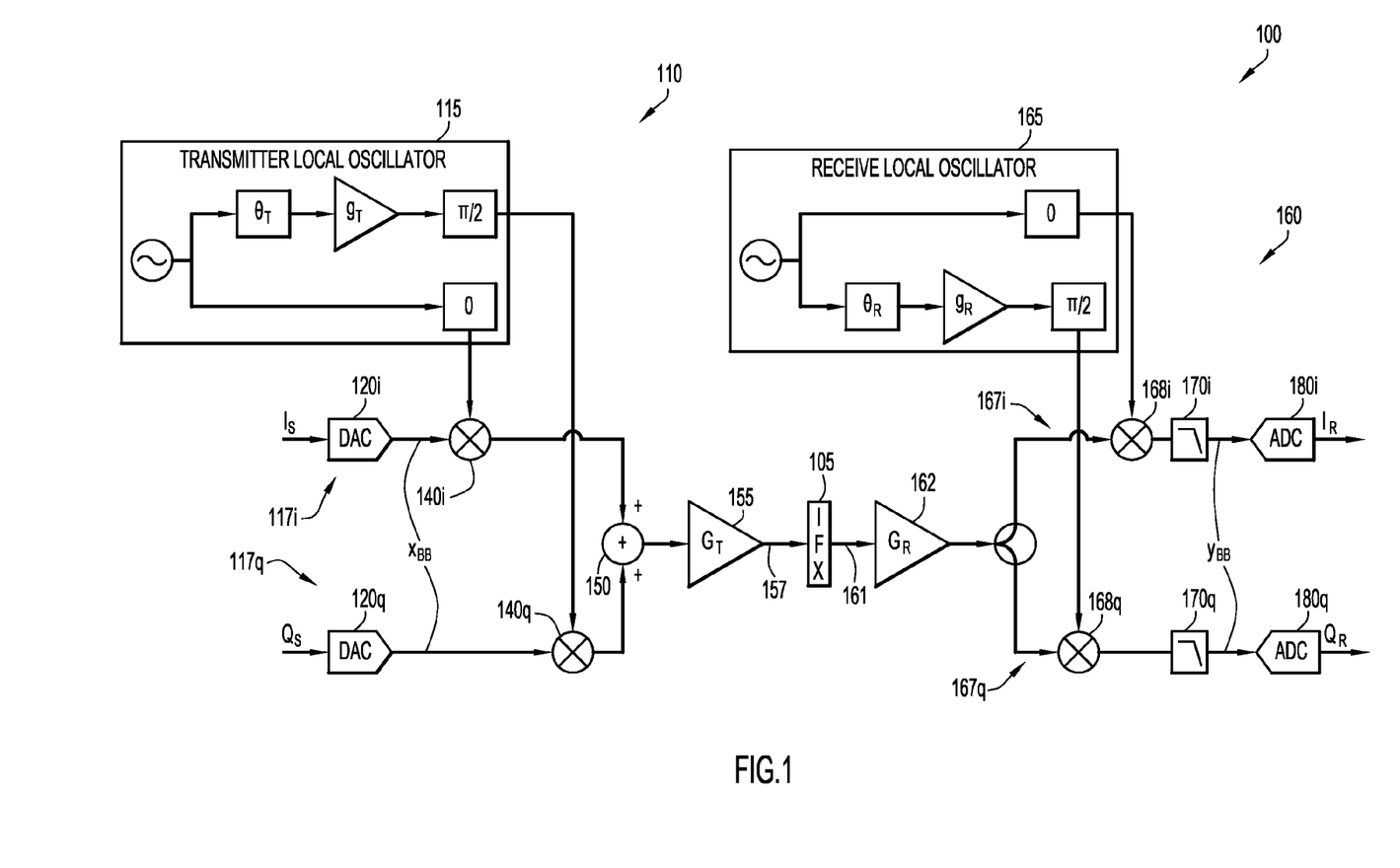
FIG. 1 is a schematic block diagram of a communication system by which gain and phase imbalances are explained.

FIG. 1 is a schematic block diagram of a communication system 100 by which gain and phase imbalances can be explained, as well as the development of a model from which analysis can be performed, as will be described below. As illustrated FIG. 1, communication system 100 includes a transmitter stage 110 and a receiver stage 160 separated by an interface 105. Interface 105 may be any combination of system components and media through which a transmitter signal 157 is transmitted and through which a received signal 161 is received. For example, interface 105 may be an antenna shared by transmitter stage 110 and receiver stage 160 by which communication signals are transmitted and received through air. On the other hand, interface 105 may be a coupler through which transmitter signal 157 is provided to receiver stage 160, such as for various calibration procedures.

Transmitter stage 110 may implement a quadrature signal processing architecture, where real and imaginary parts of an information bearing signal are processed in parallel along an in-phase (I) signal channel 117i and a quadrature (Q) signal channel 117q. Receiver stage 160 may implement a similar quadrature signal processing architecture by I signal channel 167i and a Q signal channel 167q. In certain embodiments, the front-end signal processing in transmitter stage 110, i.e., the signal processing performed prior to upconversion, and the back-end signal processing in receiver stage 160, i.e., the signal processing performed subsequent to downconversion, are performed by digital signal processing techniques on numeric I and Q data. Upconversion in transmitter stage 110 and down-conversion in receiver stage 160 may be performed in the analog domain. As such, I channel 117i and Q channel 117q each may incorporate digital-to-analog converters (DAC) 120i and 120q, respectively, to convert digital I and Q data into an analog signal that can be upconverted by analog signal processing techniques. Similarly, receiver stage 160 may incorporate analog-to-digital converters (ADC) 180i and 180q, respectively, to convert the received analog signal 161 into numeric I and Q data from which information can be extracted by digital signal processing techniques.

In typical fashion, quadrature components $I_S$ and $Q_S$ of a baseband signal are converted to an analog signal $x_{BB}(t)$ by DACs 120i and 120q and upconverted to a carrier frequency $f_{LO}$ by mixer stages 140i and 140q and transmitter local oscillator (LO) 115. The upconverted quadrature components may be combined by combiner 150 and the combined signal 152 may be amplified by amplifier 155 and transmitted through interface 150. At receiver stage 160, received signal 161 is divided into quadrature components, downconverted to baseband frequency by mixers 168i and 168q coupled to receiver LO 165, and filtered by lowpass filters 170i and 170q. The downconverted signal components of $y_{BB}(t)$ are converted to digital signal components $I_R$ and $Q_R$ through ADCs 180i and 180q, respectively. The ordinarily skilled artisan will readily recognize such signal processing and variants thereof and, as such, a detailed explanation thereof is omitted for purposes of conciseness. Additionally, it is to be understood that components and processing other than that illustrated and described with reference to FIG. 1, e.g., encoding and decoding, anti-aliasing and other filtering, etc., may be incorporated in communication system 100 to implement fully functional system, but description of such well-understood components and processing techniques are omitted for conciseness as well.

The IQ imbalances in transmitter LO 115 and receiver LO 165 may be modeled as illustrated in FIG. 1 to take into account gain and phase imbalances between I and Q signal processing channels 117i and 117q and I and Q signal processing channels 167i and 167q, respectively. The signal processing performed by communication system 100 can then be modeled to identify and characterize the effects of the LO IQ imbalances on reconstructed signals in receiver stage 160.

As illustrated in FIG. 1, the output of transmitter LO 115 can be modeled as:

$$Tx_{LO}(t) = \cos(\omega_{LO}t) + jg_T \sin(\omega_{LO}t + \theta_T), \tag{1}$$

where $g_T$ and $\theta_T$ are the transmitter LO gain and phase imbalances, respectively. Equation (1) can be re-written as, $$T_{x_{LO}}(t) = K_{T1}e^{j\omega_{LO}t} + K_{T2}e^{-j\omega_{LO}t}, \tag{2}$$

where, $$K_{T1} = \frac{1 + g_T e^{j\theta_T}}{2} \text{ and } K_{T2} = \frac{1 - g_T e^{-j\theta_T}}{2}. \tag{3}$$

The factors $K_{T1}$ and $K_{T2}$ are referred to herein as transmitter LO IQ imbalance figures of merit (TFMs); together they characterize the IQ imbalance in transmitter LO 115 through the gain and phase imbalances. In the ideal case, i.e., $g_T=1$ and $\theta_T=0$, $K_{T1}=1$ (and zero phase) and $K_{T2}=0$ and, as would be expected, the output of transmitter LO 115 is simply the ideal upconverting modulation signal $e^{j\omega_{LO}t}$. However, for non-unitary $g_T$ and non-zero $\theta_T$, IQ imbalance in transmitter LO 115 manifests itself in distortion of the desired upconverting modulation signal component $e^{j\omega_{LO}t}$ and the additional production of a detrimental modulation signal image component $e^{-j\omega_{LO}t}$. The distortion of the desired modulation signal is committed by application of the gain and phase shift characterized by $K_{T1}$ and the unwanted modulation signal image is produced in accordance with the gain and phase characterized by $K_{T2}$.

Transmitter stage 110 generates a physical signal 157, referred to herein as transmitter output signal 157, from a baseband signal upconverted by transmitter LO 115. Ignoring the effect of power amplifier 155 (i.e., $G_T=1$ for purposes of the present discussion), transmitter output signal is generated by, $$x_{RF}(t) = Re\{x_{BB}(t)(K_{T1}e^{j\omega_{LO}t} + K_{T2}e^{-j\omega_{LO}t})\}, \tag{4}$$

where $x_{RF}(t)$ is a transmitter output signal, $Re\{\cdot\}$ extracts the real part of its complex argument, by, for example, $$Re\{z\} = \frac{1}{2}(z + z^*),$$

and $x_{BB}(t)$ is a complex baseband signal being transmitted, e.g., $$x_{BB}(t) = I_{BB}(t) + jQ_{BB}(t). \tag{5}$$

Transmitter output signal 157 expressed in equation (4) can be expanded as, $$x_{RF}(t) = \tag{6}$$
$$\frac{1}{2}[K_{T1}x_{BB}(t) + K_{T2}^*x_{BB}^*(t)]e^{j\omega_{LO}t} + \frac{1}{2}[K_{T2}x_{BB}(t) + K_{T1}^*x_{BB}^*(t)]e^{-j\omega_{LO}t}.$$

Figure 2:
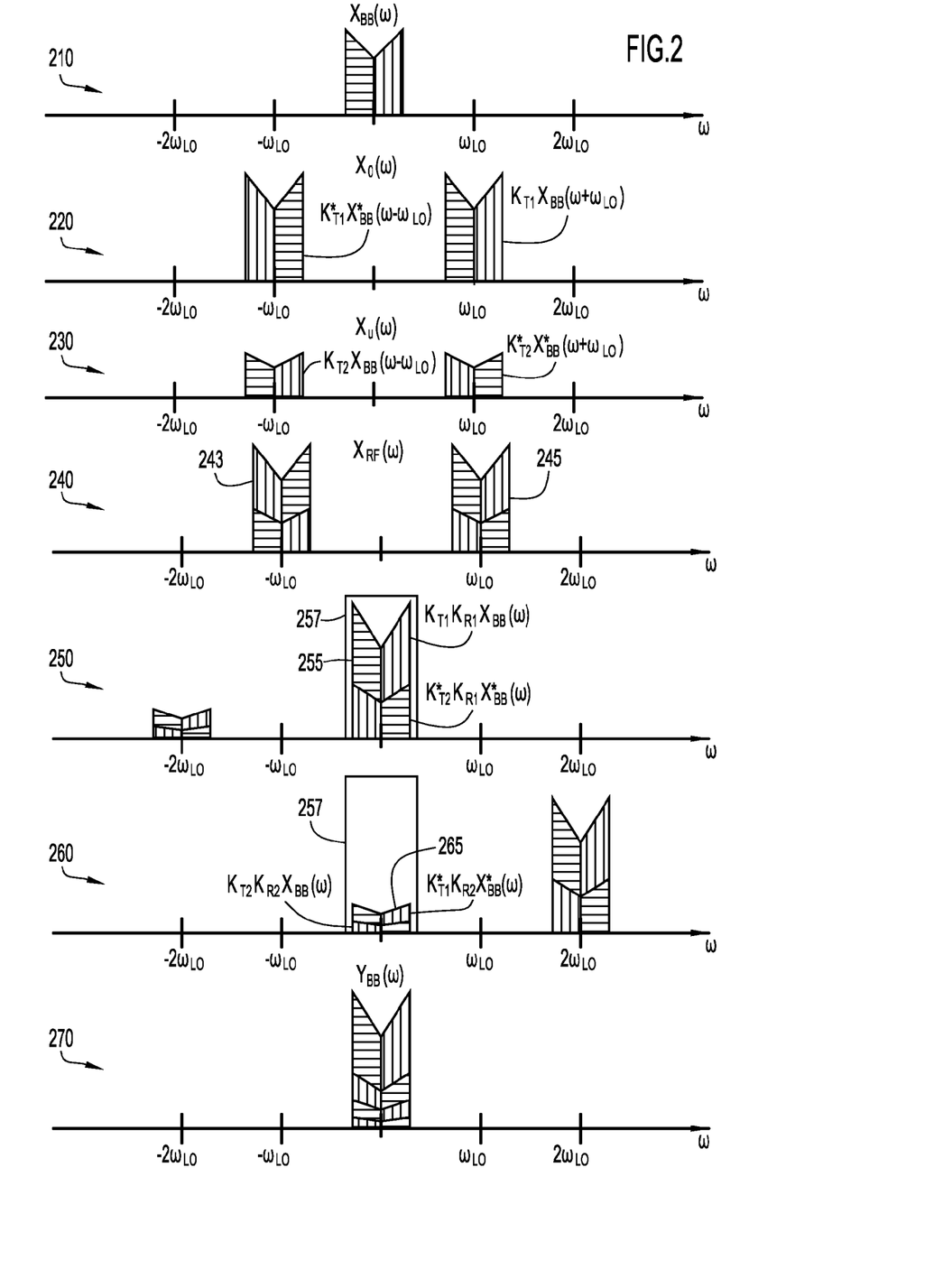
FIG. 2 is a series of graphs illustrating example frequency spectra of signals produced in the communication system of FIG. 1.

FIG. 2 depicts example frequency spectra by which identification of signal components in various modeled signals can be identified for purposes of explanation. It is to be understood that no particular modulation scheme is meant to be conveyed by the spectra of FIG. 2; the spectra are presented solely to explain, in a general way, the effects of frequency conversion in the presence of transmitter and receiver LO IQ imbalances.

For purposes of explanation, spectrum 210 represents the spectrum $X_{BB}(\omega)$ of a generic signal $x_{BB}(t)$. The effect of transmitter LO IQ imbalance on the transmitted signal $x_{RF}(t)$ can be viewed as a distortion of the desired output signal due by the gain and phase of $K_{T1}$, i.e., $$x_O(t) = \frac{1}{2} K_{T1} x_{BB}(t) e^{j\omega_{LO}t} + \frac{1}{2} K_{T1}^* x_{BB}^*(t) e^{-j\omega_{LO}t}, \quad (7)$$

the frequency spectrum of which is illustrated as spectrum 220, and further corruption by way of the generation of an unwanted signal component $x_U(t)$ owing to the presence of the transmitter LO modulation signal image $K_{T2} e^{-j\omega_{LO}t}$, i.e., $$x_U(t) = \frac{1}{2} K_{T2}^* x_{BB}^*(t) e^{j\omega_{LO}t} + \frac{1}{2} K_{T2} x_{BB}(t) e^{-j\omega_{LO}t}. \quad (8)$$

The frequency spectrum of $x_U(t)$ is illustrated as spectrum 230 in FIG. 2. The transmitter output signal $x_{RF}(t)$ is the summation of the desired (but distorted) signal component and undesired signal component, i.e., $x_{RF}(t)=x_O(t)+x_U(t)$, the spectrum of which is illustrated in FIG. 2 as spectrum 240.

As illustrated in FIG. 1, the output of receiver LO 165 can be modeled in a manner similar to that of transmitter LO 115, e.g., $$Rx_{LO}(t)=\cos(\omega_{LO}t)-jg_R \sin(\omega_{LO}t+\theta_R), \quad (9)$$

where $g_R$ and $\theta_R$ are the receiver LO magnitude and phase imbalances, respectively. Eq. (9) can be re-written as, $$Rx_{LO}t = K_{R1} e^{-j\omega_{LO}t} + K_{R2} e^{j\omega_{LO}t}, \quad (10)$$

with $$K_{R1} = \frac{1 + g_R e^{-j\theta_R}}{2} \text{ and } K_{R2} = \frac{1 - g_R e^{j\theta_R}}{2}. \quad (11)$$

The factors $K_{R1}$ and $K_{R2}$ are referred to herein as receiver LO IQ imbalance figures of merit (RFMs); together they characterize the IQ imbalance in receiver LO 165 through the gain and phase imbalances. As in the case of the transmitter LO 115, IQ imbalance in the receiver LO 165 manifests itself in a distortion of the downconverting modulation signal component $e^{-j\omega_{LO}t}$, by the gain and phase carried in $K_{R1}$, and the additional production of an unwanted modulation signal image component $e^{j\omega_{LO}t}$, by the gain and phase carried in $K_{R2}$.

Ignoring, for purposes of explanation, channel effects of interface 105 on transmitter output signal 157, receiver input signal 161 is simply the transmitter output signal 157, i.e., $x_{RF}(t)$. Ignoring the gain of low noise amplifier 162 (i.e., $G_R=1$ for purposes of the present discussion), the complex baseband signal $y_{BB}(t)$ is generated by, $$y_{BB}(t)=LPF(x_{RF}(t)[Rx_{LO}(t)])=LPF(x_{RF}(t)[K_{R1}e^{-j\omega_{LO}t}+K_{R2}e^{j\omega_{LO}t}]), \quad (12)$$

where LPF(•) represents low pass filtering of filters 170*i* and 170*q*, by which higher-order frequency components (e.g., $e^{j2\omega_{LO}t}$) are suppressed. Expanding Eq. (12), $$y_{BB}(t)=[K_{T1}K_{R1}x_S(t)+K_{T2}^*K_{R1}x_S^*(t)]+[K_{T2}K_{R2}x_S(t)+K_{T1}^*K_{R2}x_S^*(t)]=y_O(t)+y_U(t). \quad (13)$$

As indicated by Eq. (13) and described with further reference to FIG. 2, $y_{BB}(t)$ includes a signal component $y_O(t)$ resulting from downconverting the upper sideband 245 of $x_{RF}(t)$ by desired (but distorted) receiver LO modulation signal $K_{R1}e^{-j\omega_{LO}t}$. In spectrum 250, spectral band 255, located in the passband of lowpass filter 257, is the spectrum of $y_O(t)$. Baseband signal $y_{BB}(t)$ also includes a signal component $y_U(t)$ resulting from upconversion of the lower sideband 243 of $x_{RF}(t)$ by the undesired receiver LO modulation signal image $K_{R2}e^{j\omega_{LO}t}$. In spectrum 260, spectral band 265, located in the passband of lowpass filter 257, is the spectrum of $y_U(t)$. Spectrum 270, which is the summation of $y_O(t)$ and $y_U(t)$, is the spectrum of $y_{BB}(t)$ of Eq. (13).

The factors $K_{T1}K_{R1}$, $K_{T2}K_{R2}$, $K_{T2}^*K_{R1}$ and $K_{T1}^*K_{R2}$ can be viewed as applying gain and phase to respective signal components of baseband signal $y_{BB}(t)$, where the amount of gain and phase applied by each factor is a joint function of the IQ imbalances in both the receiver LO and the transmitter LO. Accordingly, these factors will be referred to herein as joint LO IQ imbalance figures of merit (JFMs). The JFMs characterize signal processing artifacts in signal $y_{BB}(t)$ and the respective mechanisms by which those artifacts came to be present in the baseband signal $y_{BB}(t)$. For example, as illustrated in FIG. 2, $K_{T1}K_{R1}$ is a JFM resulting from downconversion of the upper sideband of the desired transmitted signal component; $K_{T2}K_{R2}$ is a JFM resulting from upconversion of the lower sideband of the undesired transmitted signal component; $K_{T2}^*K_{R1}$ is a JFM resulting from downconversion of the upper sideband of the undesired transmitted signal component; and $K_{T1}^*K_{R2}$ is a JFM resulting from upconversion of the lower sideband of the desired transmitted. Eq. (13) thus forms a signal model representing the receiver signal $y_{BB}(t)$ as a combination of weighted copies of the original signal $x_{BB}(t)$, where the weights are the JFMs. Additionally, the signal model of Eq. (13) represents the receiver signal as a combination of the signal reconstruction that would be desired in the receiver, i.e., $x_{BB}(t)$, although distorted by $K_{T1}K_{R1}$, and a plurality of signal components that are the result of signal processing by modulation signal images transmitter and receiver LOs. It is to be noted that in the absence of any LO imbalance in both transmitter and receiver, i.e., in the ideal case, $K_{T1}K_{R1}$ would have zero-phase unity-gain and all other JFMs would reduce to zero thus leaving only $x_{BB}(t)$ as the reconstructed signal $y_{BB}(t)$. In light of this property, $K_{T1}K_{R1}$ will be referred to herein as a reference JFM; it characterizes the difference between the desired reconstructed signal and the signal component in the receiver signal $y_{BB}(t)$ that would be the desired reconstructed signal in the absence of LO imbalances in the transmitter and receiver, i.e., the signal component corresponding to the desired sideband in the transmitter output signal $x_{RF}(t)$ being downconverted through only the desired receiver modulation $e^{-j\omega_{LO}t}$ (and lowpass filtered).

Figure 3:
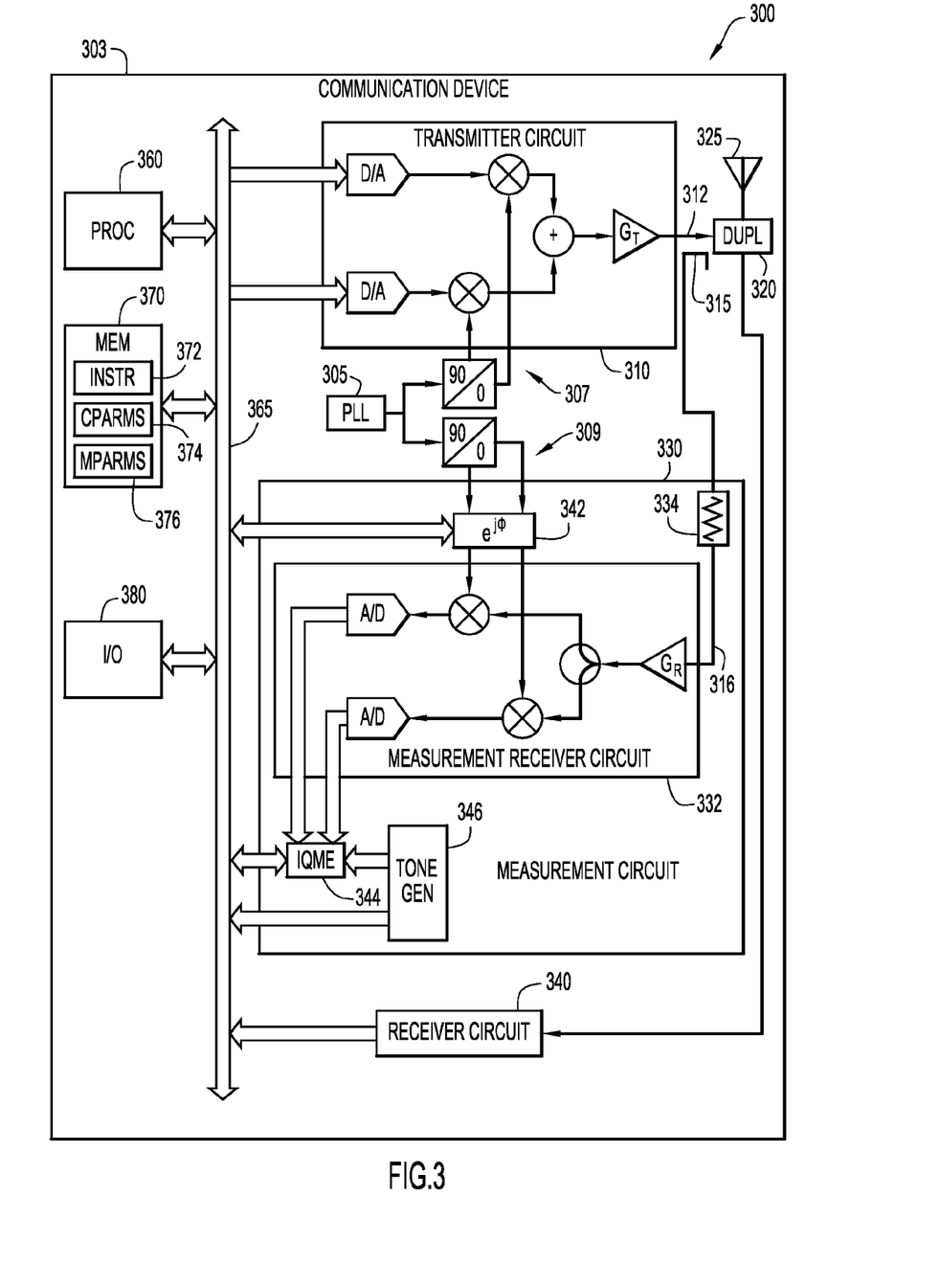
FIG. 3 is a schematic block diagram of an exemplary communication device in which the present general inventive concept may be embodied.

FIG. 3 is a schematic block diagram of an exemplary communication device 300 in which the present invention may be embodied. Communication device 300 may include a transmitter circuit 310, a receiver circuit 340 and a measurement circuit 330. Transmitter circuit 310 may be configured in a manner similar to that of transmitter stage 110 in FIG. 1, and receiver circuit 340 and measurement receiver circuit 332 in measurement circuit 330 may be configured in a manner similar to that of receiver stage 160.

In one embodiment, communication device 300 includes input/output (I/O) circuitry 380 through which a user may interact with communication device 300 and communicate over a communication network (not illustrated) therewith. For example, I/O circuitry 380 may include, among other things, a display device on which a user interface may be implemented, a speaker, a microphone, analog-to-digital and digital-to-analog circuitry to convert audio signals to and from digitally formatted data, and so on. Communication device 300 may include a processor 360 and a memory 370 to store processor instructions 372, correction parameters 374 and measurement parameters 376. Processor instructions 372 may include instructions that, when executed by processor 360, configures the processor to perform various control and signal processing functions described herein. Correction parameters 374 include data by which I and Q gain and phase imbalance is reduced or eliminated in transmitter circuit 310 and the receiver circuit that was used in a calibration procedure by which the joint transmitter/receiver artifacts were measured, i.e., one of measurement receiver circuit 332 and receiver circuit 340.

Information may be provided by a user through I/O circuitry 380 and may be encoded into quadrature information bearing signals by operations of processor 360. The quadrature information bearing signals may be upconverted and amplified by transmitter circuit 310 and transmitted to a remote location via an antenna 325. An information bearing signal from a remote location may be intercepted by antenna 325 and provided to receiver circuit 320 where it is downconverted and formatted into quadrature signal components that may be processed by operations of processor 360 into information that can be perceived by a user through I/O circuitry 380. In certain embodiments, transmitter circuit 310 and receiver circuit 320 share a common antenna 315 and are isolated one from the other by a duplexer 320.

Measurement circuit 330 may be incorporated in communication device 300 to ascertain IQ mismatch correction (IQMC) data and may be activated for purposes of system calibration. For example, an authorized user may input a command through I/O circuitry 380 to begin an IQ imbalance calibration procedure. Measurement circuit 330 contains all the necessary functionality to estimate the joint gain and phase imbalance of the combination of transmitter circuit 310 and measurement receiver circuit 332 (or receiver circuit 340), referred to herein as IQ mismatch estimation (IQME) and, therefrom, to determine IQMC data that ameliorates the imbalance. It is to be understood that while measurement circuit 330 incorporates its own measurement receiver 332, other embodiments may utilize receiver circuit 340 in the IQME process described below. When so embodied, suitable switching circuitry may be incorporated to couple receiver circuit 340 to measurement circuit 330 for purposes of calibration and to decouple receiver circuit 340 from measurement circuit 330 for normal operation. The ordinarily skilled artisan will recognize such implementation upon review of this disclosure. However, in cases where imbalances in only the transmitter circuit 310 are being calibrated by the IQME technique described herein, an additional measurement receiver circuit 332 may reduce the complexity in overall calibration circuit requirements. For purposes of explanation and not limitation, descriptions of IQME and IQMC below will assume the use of measurement receiver circuit 332.

Upon the aforementioned calibration command, tone generator 346 in measurement circuit 330 may generate a digital signal representing a single tone, i.e., $$x_S(n) = \cos(\Omega n) + j\sin(\Omega n) = e^{j\Omega n} \quad (14)$$

where, $\Omega$ is normalized frequency $2\pi(f_S/f_{SAMP})$, $f_S$ is frequency of the tone and $f_{SAMP}$ is the system sampling frequency. Unity amplitude and zero initial phase is assumed. The single tone signal generated by tone generator 346 is processed per usual signal processing procedures, i.e., those that would be performed during normal operation of communication device 300 and those that have been modeled as described above. The signal is then transmitted by transmitter 310 as transmitter output signal 312. A sample of transmitter output signal 312 may be extracted by a coupler 315 and provided to measurement circuit 330. An attenuator 334 may be interposed between coupler 315 and measurement receiver circuit 332 to reduce the signal level of sample signal 316 from full power signal level of transmitter 310. In other embodiments, suitable switching circuitry may be incorporated that bypasses the antenna for purposes of calibration. Measurement receiver circuit 332 downconverts sample signal 316 and provides such to IQME processor 344.

Figure 4:
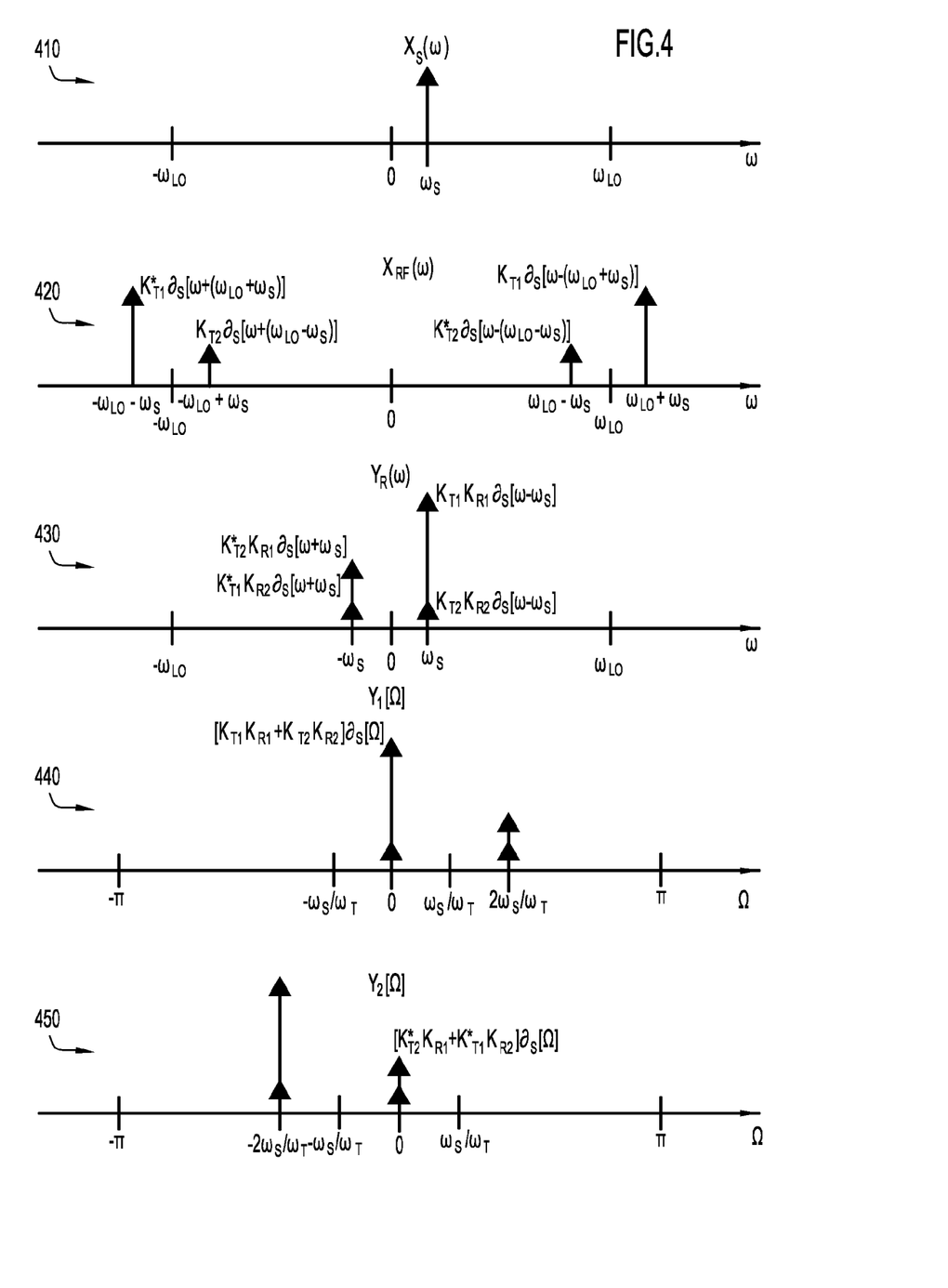
FIG. 4 is a series of graphs illustrating example frequency spectra of signals produced in the communication device of FIG. 3 for purposes of calibration in accordance with embodiments of the present general inventive concept.

Referring to FIG. 4, spectrum 410 is a generalized representation of the baseband frequency spectrum of the test tone $x_S(t)$ (corresponding to $x_{BB}(t)$ in FIGS. 1 and 2). Following the signal processing model described above with reference to FIGS. 1 and 2, spectrum 420 is the generalized representation of transmitter output signal 312 and spectrum 430 is the baseband frequency spectrum of the measurement receiver output signal $y_R(t)$ (corresponding to $y_{BB}(t)$ in FIGS. 1 and 2). A digital representation of the measurement receiver output signal $y_R(t)$ and a digital representation of the test tone $x_S(t)$ are provided to IQME processor 244, where the signals are analyzed and, from the analysis, IQ mismatch calibration data are generated.

Figure 5:
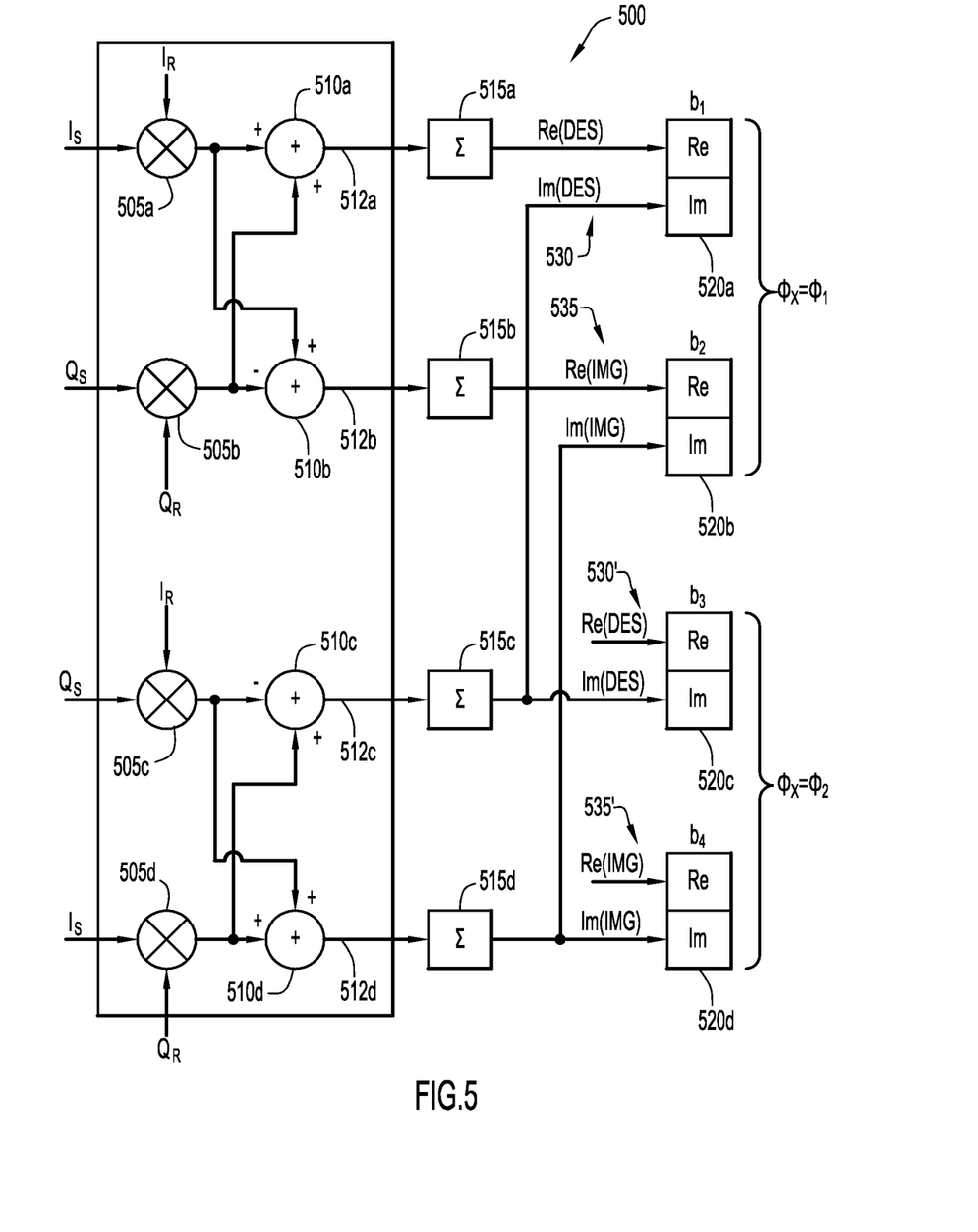
FIG. 5 is a schematic block diagram of an exemplary in-phase and quadrature mismatch estimator that may be used in conjunction with the present general inventive concept.

FIG. 5 is a schematic block diagram of an exemplary IQME processor 500 that may be used in conjunction with the present invention, such as by being incorporated in measurement circuit 230 as IQME processor 244. In the illustrated embodiment, IQME processor 500 is based on principles of a double-quadrature mixer often used for RF image rejection. A double-quadrature mixer typically comprises four (4) mixers and two (2) adders and mixes two (2) quadrature signals to produce one (1) quadrature output signal. IQME 500 comprises two such configurations by the addition of two (2) more adders or, in digital embodiments, two additional complex addition processes, to implement dual channel complex mixer 502. For example, in complex mixer 502, one double-quadrature mixer is constructed from mixers 505a-505d and adders 510a and 510c. The quadrature output would take the form $U(t) = [I_S(t)I_R(t) + Q_S(t)Q_R(t)] + j[I_S(t)Q_R(t) - Q_S(t)I_R(t)]$, where the real part of $U(t)$ would emerge as signal 512a and the imaginary part of $U(t)$ would emerge as signal 512c. Another double-quadrature mixer may be constructed from mixers 505a-505d and adders 510b and 510d, from which the quadrature output would take the form $L(t) = [I_S(t)I_R(t) - Q_S(t)Q_R(t)] + j[I_S(t)Q_R(t) + Q_S(t)I_R(t)]$. In this case, the real part of $L(t)$ emerges as signal 512b and the imaginary part of $L(t)$ emerges as signal 512d. It is to be noted that $U(t)$ is transformed to $L(t)$ if $I_S(t) + jQ_S(t)$ is complex conjugated to $I_S(t) - jQ_S(t)$. The ordinarily skilled artisan will recognize such processing from RF image rejection mixers, where, in such a case, $I_R(t) + jQ_R(t)$ would be a received transmitter signal, $I_S(t) + jQ_S(t)$ is the receiver LO signal, e.g., $e^{-j\omega_{LO}t}$ and $I_S(t) - jQ_S(t)$ is the conjugate of the receiver LO signal, i.e., $e^{j\omega_{LO}t}$. Accordingly, the output $U(t)$ of the double quadrature mixer would represent one sideband of the received signal, for example, the upper sideband (the lower sideband being rejected) and $L(t)$ would represent the other sideband of the received signal, for example, the lower sideband (the upper sideband being rejected). In descriptions that follow, the two quadrature output channels of the double-quadrature mixer 502 in IQME 500 will be referred to as representing a desired sideband, i.e., the upper or lower sideband that encompasses only the frequencies in the spectrum of the original signal, e.g., the test signal $x_S(n)$, and an image sideband, i.e., the other of the upper or lower sideband that encompasses the frequencies of the original signal's image.

IQME processor 500 may implement a digitally-equivalent embodiment of the double-quadrature mixer architecture as a signal comparator. As will be recalled by the ordinarily skilled artisan, when two signals of like frequency are applied to a mixer, the output of the mixer is a DC signal having a signal level that is a function of the phase difference between the two input signals. Exemplary IQME processor 500 operates in similar fashion albeit in the digital signal processing domain. That is, since the receiver baseband signal $y_R(t)$ and test tone $x_S(t)$ are of the same frequency, frequency mixing the two signals would manifest itself as a difference in amplitude and phase. IQME processor 500 produces signals indicative of these differences for both the desired and image sidebands on desired sideband channel 530 and image sideband channel 535.

Referring back to FIG. 3, exemplary communication device 300 includes a phase locked loop (PLL) oscillator 305 from which transmitter LO signal 307 and measurement receiver LO signal 309 are derived. Measurement circuit 330 may include a phase shifter 342 that adjusts the measurement receiver LO signal 309 relative to transmitter LO signal 307 by an amount φ. In other embodiments, a phase shifter may be established in the feed line to the receiver circuit to apply the phase shift directly to the RF signal. The additional phase offset in the transmitter output signal in Eq. (6) is reflected as, $$x_{RF}(t) = \frac{1}{2}[K_{T1}x_{BB}(t) + K_{T2}^*x_{BB}^*(t)]e^{j(\omega_{LO}t+\phi)} + \frac{1}{2}[K_{T2}x_{BB}(t) + K_{T1}^*x_{BB}^*(t)]e^{-j(\omega_{LO}t+\phi)} \quad (15)$$

Upon substituting Eq. (15) into Eq. (13) and rearranging terms, the received baseband signal $y_{BB}(t)$ becomes, $$y_{BB}(t) = [K_{T1}K_{R1}e^{j\phi} + K_{T2}K_{R2}e^{-j\phi}]x_{BB}(t) + [K_{T2}^*K_{R1}e^{j\phi} + K_{T1}^*K_{R2}e^{-j\phi}]x_{BB}^*(t). \quad (16)$$

As illustrated by Eq. (16), the applied phase shift may be modeled in receiver signal $y_{BB}(t)$ as complex weights that rotate the JFMs in the complex plane. For purposes of description, the JFMs weighted by $e^{j\phi}$ will be referred to herein as rotated JFMs and the JFMs weighted by $e^{-j\phi}$ will be referred to herein as counter-rotated JFMs.

Applying test tone $x_S(n)$ of Eq. (16) as the baseband input signal, the digital received baseband signal $y_R(n)$ after the analog-to-digital conversion is given by, $$y_R(n) = I_R(n) + jQ_R(n) = [K_{T1}K_{R1}e^{j\phi} + K_{T2}K_{R2}e^{-j\phi}]e^{j\Omega n} + [K_{T2}^*K_{R1}e^{j\phi} + K_{T1}^*K_{R2}e^{-j\phi}]e^{-j\Omega n}. \quad (17)$$

As discussed above, IQME processor 500 has two output channels 530 and 535, one for each sideband. As a signal comparator, and per the sideband processing discussion above, IQME processor 500 thus produces a signal, $$y_1 = e^{j\Omega n}([K_{T1}K_{R1}e^{j\phi} + K_{T2}K_{R2}e^{-j\phi}]e^{j\Omega n} + [K_{T2}^*K_{R1}e^{j\phi} + K_{T1}^*K_{R2}e^{-j\phi}]e^{-j\Omega n}), \quad (18)$$

on the desired sideband channel 530, the spectrum of which is illustrated in spectrum 440 of FIG. 4, and a signal, $$y_2 = e^{-j\Omega n}([K_{T1}K_{R1}e^{j\phi} + K_{T2}K_{R2}e^{-j\phi}]e^{j\Omega n} + [K_{T2}^*K_{R1}e^{j\phi} + K_{T1}^*K_{R2}e^{-j\phi}]e^{-j\Omega n}), \quad (19)$$

on the image sideband channel 535, the spectrum of which is illustrated in spectrum 450 of FIG. 4. Integration over an integral number of periods of the test tone $x_S(n)$ by integrators 515a-515d removes the non-DC components from the output signals.

During a calibration procedure, phase shifter 342 may be compelled to introduce a phase shift of $\phi_1$ and the outputs of the signal comparator are stored in registers 520a and 520b in FIG. 5, i.e., $$b_1 = K_{T1}K_{R1}e^{j\phi_1} + K_{T2}K_{R2}e^{-j\phi_1}, \text{ and} \quad (20)$$

$$b_2 = K_{T2}^*K_{R1}e^{j\phi_1} + K_{T1}^*K_{R2}e^{-j\phi_1}, \quad (21)$$

where $b_1$ is the output on the desired sideband channel 530 of IQME processor 500 and $b_2$ is the output on the image sideband channel 535. In a subsequent operation, phase shifter 342 may introduce a phase shift of $\phi_2$, and analysis of another set of measurements is conducted, the results of which are stored in registers 520c and 520d, i.e., $$b_3 = K_{T1}K_{R1}e^{j\phi_2} + K_{T2}K_{R2}e^{-j\phi_2}, \text{ and} \quad (22)$$

$$b_4 = K_{T2}^*K_{R1}e^{j\phi_2} + K_{T1}^*K_{R2}e^{-j\phi_2}, \quad (23)$$

where $b_3$ is the output on the desired sideband channel 530 (illustrated at 530') of IQME processor 500 and $b_4$ is the output on the image sideband channel 535 (illustrated at 535'). The complex values $b_1$-$b_4$ are referred to herein as difference signal measurements and indicate characteristic differences between the receiver signal $y_R(t)$ and the test tone $x_S(t)$. The choice of $\phi_1$ and $\phi_2$ is arbitrary and in certain embodiments, the phase shifts are chosen to have $\phi_2 = -\phi_1$. Additionally, it is to be understood that techniques other than the complex mixing techniques may be used to obtain the difference signal measurements $b_1$-$b_4$, including correlation and adaptive techniques.

Eqs. (20)-(23) comprise four (4) equations in four (4) unknowns, which can be solved through linear algebra. For example, Eqs. (20)-(23) can be written in matrix format as, $$\begin{bmatrix} e^{j\phi_1} & e^{-j\phi_1} & 0 & 0 \\ 0 & 0 & e^{j\phi_1} & e^{-j\phi_1} \\ e^{j\phi_2} & e^{-j\phi_2} & 0 & 0 \\ 0 & 0 & e^{j\phi_2} & e^{-j\phi_2} \end{bmatrix} \begin{bmatrix} K_{T1}K_{R1} \\ K_{T2}K_{R2} \\ K_{T2}^*K_{R1} \\ K_{T1}^*K_{R2} \end{bmatrix} = \begin{bmatrix} b_1 \\ b_2 \\ b_3 \\ b_4 \end{bmatrix} \quad (24)$$

or PK=B. The presently disclosed technique makes it possible to compute all JFMs from difference measurements obtained through no greater than two (2) phase shifts. The solution to Eq. (24) is, $$\begin{bmatrix} K_{T1}K_{R1} \\ K_{T2}K_{R2} \\ K_{T2}^*K_{R1} \\ K_{T1}^*K_{R2} \end{bmatrix} = \begin{bmatrix} z_A & 0 & z_B & 0 \\ z_A^* & 0 & z_B^* & 0 \\ 0 & z_A & 0 & z_B \\ 0 & z_A^* & 0 & z_B^* \end{bmatrix} \begin{bmatrix} b_1 \\ b_2 \\ b_3 \\ b_4 \end{bmatrix}, \quad (25)$$

or K=ZB, where Z=P$^{-1}$, $z_A$ and $z_B$ are complex quantities each defined by both $\phi_1$ and $\phi_2$. Solving matrix Eq. (24) produces a transform matrix Z that assigns values to JMFs. The transmitter and receiver IQMC data may be determined from the JFMs assigned to K by Eq. (25). For example, elements of K may be chosen such that in the ratio the dependency of the JFMs on one or the other of the transmitter and the receiver LO imbalance is removed. A mismatch correction factor for the transmitter LO may be computed from:

$$T_{IQMC} = -\frac{K_{T_2}^* K_{R_1}}{K_{T_1} K_{R_1}} = -\frac{(1-g_T e^{j\phi_T})}{(1+g_T e^{j\phi_T})}, \quad (26)$$

i.e., the ratio of the rotated JFM in the image sideband to the reference JFM. Similarly, a mismatch correction factor for the receiver LO may be computed from:

$$R_{IMQC} = -\frac{K_{T_1}^* K_{R_2}}{conj(K_{T_1} K_{R_1})} = -\frac{(1-g_R e^{j\phi_R})}{(1+g_R e^{-j\phi_R})}, \quad (27)$$

i.e., the ratio of the counter-rotated JFM in the image sideband to the complex conjugate of the reference JFM.

In certain embodiments, the phase shifts $\phi_1$ and $\phi_2$ are selected and fixed in advance. When so embodied, the transform matrix Z may be pre-computed and stored as a measurement parameter 376 in memory 370. Accordingly, once the difference measurements $b_1$-$b_4$ have been obtained, the joint figures of merit in matrix K are readily computed.

$T_{IQMC}$ and $R_{IQMC}$ may be stored as correction parameters 374 and applied to the corresponding transmitter circuit 310 or measurement receiver circuit 332 to compensate for the gain and phase imbalances in each circuit. The present invention is not limited to a particular correction technique. In certain embodiments, both correction factors are applied to the corresponding digital baseband signals, e.g., for the transmitter, $$\tilde{x}_{BB}(n)=x_{BB}(n)+T_{IQMC}x_{BB}^*(n),$$

where $\tilde{x}_{BB}(n)$ is the pre-corrected input signal that is to be upconverted and transmitted as $x_{RF}(t)$ and $x_{BB}^*(n)$ is the complex conjugate of $x_{BB}(n)$. Similarly, in the receiver, $$\tilde{y}_{BB}(n)=y_{BB}(n)+R_{IQMC}y_{BB}^*(n),$$

where $\tilde{y}_{BB}(n)$ is the post-corrected receiver baseband signal that has been downconverted from $x_{RF}(t)$ and $y_{BB}^*(n)$ is the complex conjugate of $y_{BB}(n)$.

In certain embodiments, the measurement circuit 330 is a permanent circuit of communication device 300 and may be enclosed in the same enclosure, representatively illustrated at enclosure 203, that the rest of the circuitry of communication device 300 is enclosed. When so embodied, no external equipment as required to perform IQ imbalance calibration. Additionally, in certain embodiments, calibrating only the transmitter LO by the disclosed technique is of interest, in which case the IQMC data for the receiver, typically the measurement receiver circuit 332 need not be computed.

Figure 6:
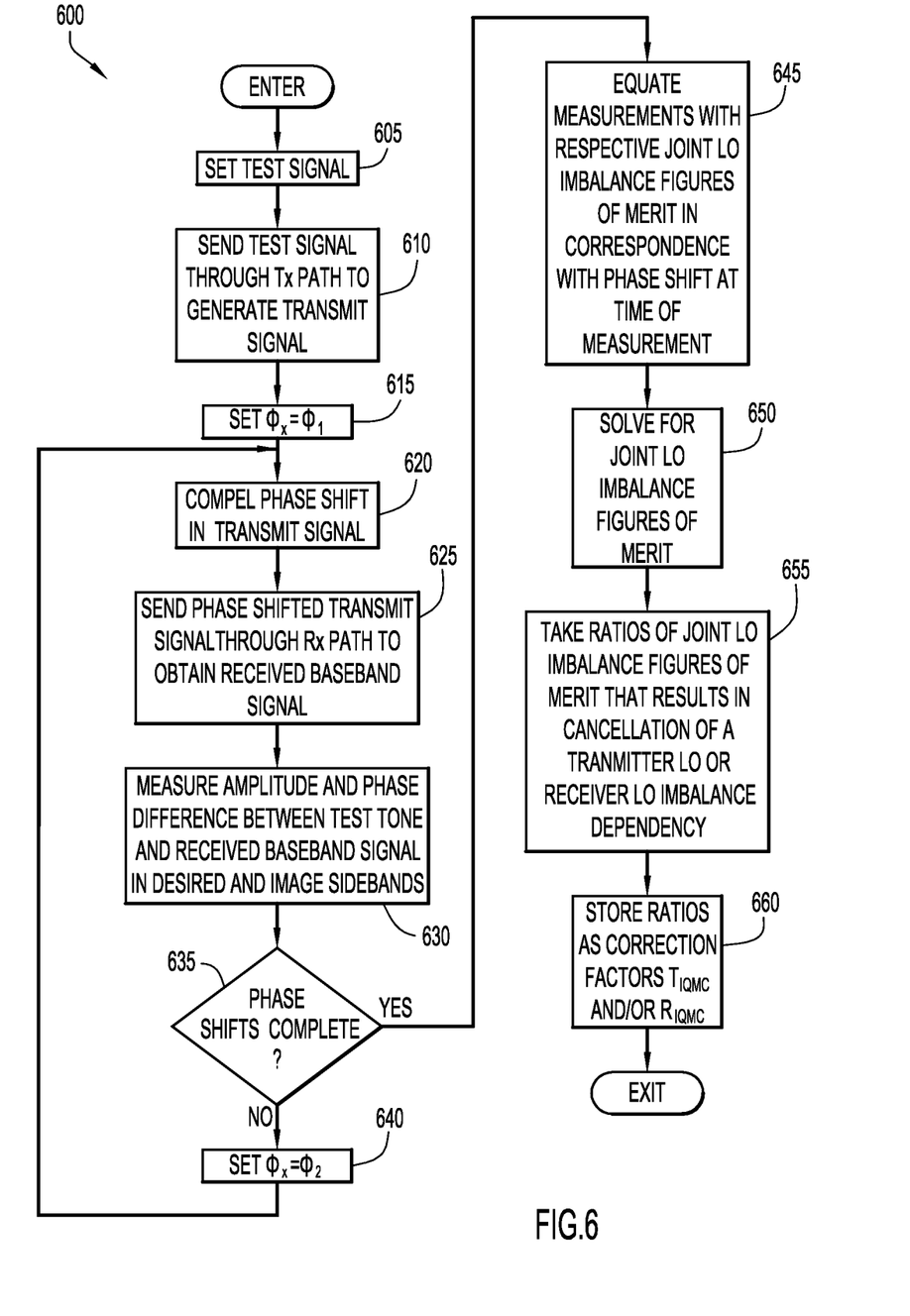
FIG. 6 is a flow diagram of an exemplary calibration process by which the present general inventive concept may be embodied.

FIG. 6 is a flow diagram of an exemplary calibration process 600 by which the present invention may be embodied. In operation 605, a test signal is generated, such as the test tone described above, by tone generator 346. In operation 610, the test signal $x_S(t)$ is processed by components in the signal processing path of transmitter 310 in which, among other things, the test signal is upconverted to the carrier frequency $f_{LO}$, and emerges from the transmitter 310 as transmitter output signal $x_{RF}(t)$. In operation 615, the first of two phase shifts $\phi_X=\phi_1$ is assigned and, in operation 620, phase shifter 342 introduces the phase shift $\phi_1$ into the transmitter output signal $x_{RF}(t)$. The phase shifted transmitter output signal is provided to receiver circuit 332 (or alternatively to receiver circuit 340), where, in operation 625, it is processed by components in the receiver processing path. Among other things, phase shifted transmitter output signal is downconverted into baseband receiver signal $y_R(t)$. In operation 630, which may be performed by IQME processor 344, the receiver signal $y_R(t)$ and test signal $x_S(t)$ are compared and a measurement indicative of the amplitude and phase difference between the signals in both the desired and image sidebands is measured and stored, such as in registers 520a-520d. In operation 635, it is determined whether measurements for both phase shifts have been obtained and, if not, the second of the two phase shifts $\phi_X=\phi_2$ is assigned in operation 640, and another set of measurements is taken, beginning with operation 620. If, however, it is determined in operation 635 that measurements under both phase shifts have been obtained, process 600 transitions to operation 645, where the IQMC data estimation begins.

In operation 645, the difference signal measurements are equated to the JMFs and the phase shifts at which the measurements were taken, such as by the system of equations assembled as matrix Eq. (24). In operation 650, matrix Eq. (24) is solved, e.g., by matrix Eq. (25), which assigns values to the JFMs. The JFMs in which TFMs or RFMs cancel by their ratios are identified, as described above, and such ratios are taken in operation 655. The ratios are then stored, in operation 660, as correction factors $T_{IQMC}$ and $R_{IQMC}$, such as in correction parameters storage location 374 of memory 370.

Figure 7:
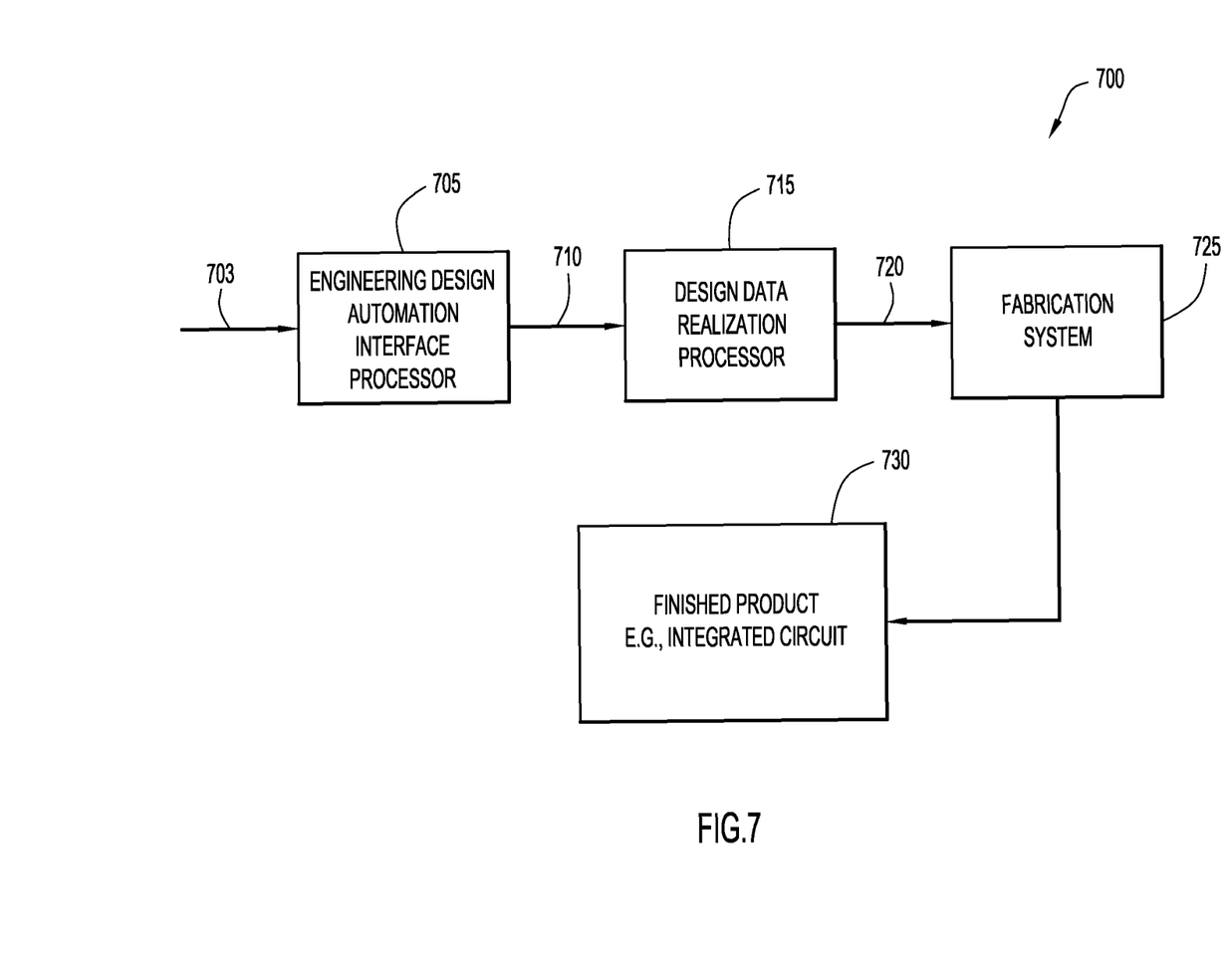
FIG. 7 is a block diagram of a circuit design and fabrication process by which a circuit embodying the present general inventive concept may be fabricated.

Certain embodiments of the present invention provide for the functional components to manufactured, transported, marketed and/or sold as processor instructions encoded on non-transitory computer-readable media. For example, as illustrated in FIG. 7, one such computer-readable medium (not illustrated) may be provided to a circuit fabrication process 700 carrying processor instructions 703 that, when executed by an Electronic Design Automation (EDA) interface processor 705, a graphical representation of an embodiment of the present invention is presented to a user, such as on a display device (not illustrated). Through EDA interface processor 705, a circuit designer may incorporate the present invention into a larger circuit design. Once a circuit design has been completed, another non-transitory computer-readable medium (not illustrated) carrying other processor instructions 710, such as a hardware description language, may be provided to a design data realization processor 715. The design data realization processor 715 may convert the instructions 710 provided thereto into another set of processor instructions 720, by which a tangible e.g., integrated circuit 730, may be realized when executed by a circuit fabrication system 725. Processor instructions 720 operate on realization data to construct component and interconnect mask patterns, component placement location data, packaging data, and any other data necessary in a fabrication process to produce the finished circuit product 730. Other realization data may include milling machine instructions and wiring instruction data, where the specific form of the realization data is dependent on the type of circuit 730 in which the present invention is embodied.

Processor instructions 703, 710 and 720 may be encoded on non-transitory computer-readable media. The present general inventive concept, when so embodied, can be practiced regardless of the processing platform on which the processor instructions are executed and regardless of the manner by which the processor instructions are encoded on the computer-readable medium.

It is to be understood that the computer-readable medium described above may be any non-transitory medium on which the instructions 703, 710 and 720, as well as processor instructions that implement process 600 in FIG. 6, may be encoded and then subsequently retrieved, decoded and executed by a processor, where such media includes electrical, magnetic and optical storage devices. Examples of non-transitory computer-readable media include, but not limited to, read-only memory (ROM), random-access memory (RAM), and other electrical storage; CD-ROM, DVD, and other optical storage; and magnetic tape, floppy disks, hard disks and other magnetic storage. The processor instructions may be derived from algorithmic constructions in various programming languages that realize the present invention as exemplified by the embodiments described above.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. A method of generating local oscillator (LO) in-phase/quadrature (IQ) imbalance correction data in a radio-frequency (RF) communication apparatus comprising a receiver and a transmitter, the method comprising:
    generating a baseband receiver signal in the receiver from an RF transmitter output signal transmitted from the transmitter, the transmitter output signal being generated by the transmitter from a known baseband test signal;
    generating difference signals indicating a characteristic difference between the receiver signal and the test signal in respective frequency bands of the receiver signal under influence of a phase shift applied to the transmitter output signal;
    acquiring a set of measurements of the difference signals as the transmitter output signal is phase-shifted through no greater than two (2) predetermined arbitrary phase shifts;
    computing joint LO IQ imbalance figures of merit (JFMs) from the acquired difference signal measurements that characterize respective signal processing artifacts in the receiver signal from joint signal processing in the transmitter and the receiver under influence of LO IQ imbalance in the transmitter and LO IQ imbalance in the receiver;
    determining the LO IQ imbalance correction data from the computed JFMs that characterize the transmitter LO IQ imbalance distinctly from the receiver LO IQ imbalance,
    wherein computing the JFMs comprises:
        retrieving a transform matrix containing complex weights computed from a known relationship between the difference signals, the JFMs and the phase shifts; and
        applying the transform matrix to a vector of the difference signal measurements in accordance with the known relationship to compute the JFMs;
    determining an inverse of a matrix populated with complex weights indicative of the respective phase shifts under which each of the difference signals is measured, the matrix being populated in accordance with a set of equations defining the known relationship; and
    storing the inverse of the matrix as the transform matrix;
    wherein measuring the difference signal comprises:
        measuring a signal indicative of a phase and amplitude difference between the receiver signal and the test signal in each of a desired sideband and an image sideband of the receiver signal for each of the two (2) arbitrary phase shifts introduced in the transmitter output signal; and
        storing values indicative of the signal measurements as the respective difference signal measurements; and
    wherein determining the LO IQ imbalance correction data comprises:
        selecting a JFM from the JFMs as a reference JFM that has zero-phase unity gain in the absence of the LO IQ imbalances in the transmitter and the receiver;
        computing at least one ratio between one of the JFMs computed from the difference signals in the image sideband and the reference JFM; and
        storing the ratio as the LO IQ imbalance correction data.

2. The method of claim 1, wherein computing the ratio comprises:
    dividing the JFM of the image sideband that is rotated by the phase shift and the reference JFM to compute the ratio for the transmitter LO IQ imbalance correction data.

3. The method of claim 2, wherein computing the ratio further comprises:
    dividing the JFM of the image sideband that is counter-rotated by the phase shift and the reference JFM to compute the ratio for the receiver LO IQ imbalance correction data.

4. A communication apparatus comprising:
    a transmitter to transmit radio-frequency (RF) signals from a baseband signal provided thereto, the transmitter including a transmitter local oscillator (LO) to upconvert the baseband signal to a selected carrier frequency;
    a receiver to receive RF signals at the carrier frequency and to generate therefrom receiver signals, the receiver including a receiver LO to downconvert the received RF signals to a receiver baseband frequency;
    a test signal generator to generate and provide a known baseband test signal to the transmitter as the baseband signal;
    an interface to provide an RF transmitter output signal generated by the transmitter from the test signal to the receiver;
    a phase shifter to introduce an arbitrary phase shift into the transmitter output signal in response to a signal identifying the phase shift;
    a measurement circuit to measure a difference signal indicative of a characteristic difference between a baseband receiver signal downconverted by the receiver from the transmitter output signal and the test signal; and
    a processor configured to:
        generate signals identifying each of a set of predetermined arbitrary phase shifts and providing the signals to the phase shifter;
        acquiring difference signals measurements from the measurement circuit as the transmitter output signal is phase-shifted through no greater than two (2) predetermined arbitrary phase shifts;
        compute joint LO IQ imbalance figures of merit (JFMs) from the difference signal measurements such that the JFMs characterize respective signal processing artifacts in the receiver signal from joint signal processing in the transmitter and the receiver under influence of LO IQ imbalance in the transmitter and LO IQ imbalance in the receiver; and determining LO IQ imbalance correction data from the computed JFMs that characterize the transmitter LO IQ imbalance distinctly from the receiver LO IQ imbalance, wherein the measurement circuit comprises:
    a signal comparator to generate a signal indicative of a phase and amplitude difference between the receiver signal and the test signal in each of a desired sideband and an image sideband of the receiver signal for each of the two (2) arbitrary phase shifts introduced in the transmitter output signal; and
    memory to store values representative of the signal as the respective difference signal measurements; and wherein the processor is further configured to:
    compute a ratio of the JFM in the image sideband that is weighted as being rotated by the phase shift to a reference JFM selected from the JFMs that has zero-phase unity-gain in the absence of the LO IQ imbalances in the transmitter and the receiver; and
    store the ratio as transmitter LO IQ imbalance correction data.

5. The apparatus of claim 4, wherein processor is further configured to:
    retrieve a transform matrix containing complex weights computed from a known relationship between the difference signal measurements, the JFMs and the two (2) arbitrary phase shifts; and
    apply the transform matrix to a vector of the difference signal measurements to compute the JFMs.

6. The method of claim 5, wherein the processor is further configured to:
    determine an inverse of a matrix populated with complex weights indicative of the respective two (2) arbitrary phase shifts under which each of the difference signals is measured, the matrix being populated in accordance the known relationship; and
    store the inverse of the matrix as the transform matrix.

7. A tangible, non-transitory computer readable medium having encoded thereon processor instructions that when executed by a processor, configure the processor to:
    generate a radio-frequency (RF) transmitter output signal in an RF transmitter from a known baseband test signal;
    generate a baseband receiver signal in a receiver from the RF transmitter output signal transmitted from the transmitter;
    generate difference signals indicating a characteristic difference between the receiver signal and the test signal in respective frequency bands of the receiver signal under influence of a phase shift applied to the transmitter output signal;
    acquire a set of measurements of the difference signals as the transmitter output signal is phase-shifted through no greater than two (2) predetermined arbitrary phase shifts;
    compute joint LO IQ imbalance figures of merit (JFMs) from the acquired difference signal measurements that characterize respective signal processing artifacts in the receiver signal from joint signal processing in the transmitter and the receiver under influence of LO IQ imbalance in the transmitter and LO IQ imbalance in the receiver;
    determine the LO IQ imbalance correction data from the computed JFMs that characterize the transmitter LO IQ imbalance distinctly from the receiver LO IQ imbalance;
    retrieve a transform matrix containing complex weights computed from a known relationship between the difference signals, the JFMs and the phase shifts;
    apply the transform matrix to a vector of the difference signal measurements in accordance with the known relationship to compute the JFMs;
    determine an inverse of a matrix populated with complex weights indicative of the respective phase shifts under which each of the difference signals is measured, the matrix being populated in accordance with a set of equations defining the known relationship;
    store the inverse of the matrix as the transform matrix;
    measure a signal indicative of a phase and amplitude difference between the receiver signal and the test signal in each of a desired sideband and an image sideband of the receiver signal for each of the two (2) arbitrary phase shifts introduced in the transmitter output signal;
    store values indicative of the signal measurements as the respective difference signal measurements;
    select a JFM from the JFMs as a reference JFM that has zero-phase unity gain in the absence of the LO IQ imbalances in the transmitter and the receiver;
    compute at least one ratio between one of the JFMs computed from the difference signals in the image sideband and the reference JFM; and
    store the ratio as the LO IQ imbalance correction data.

8. The computer readable medium of claim 7, wherein the processor instructions include processor instructions that configure the processor to:
    divide the JFM of the image sideband that is rotated by the phase shift and the reference JFM to compute the ratio for the transmitter LO IQ imbalance correction data.

9. The computer readable medium of claim 8, wherein the processor instructions include processor instructions that configure the processor to:
    divide the JFM of the image sideband that is counter-rotated by the phase shift and the reference JFM to compute the ratio for the receiver LO IQ imbalance correction data.

\* \* \* \* \*